W. HEILMAN.
Gearing for Traction-Engines.
No. 225,827. Patented Mar. 23, 1880.
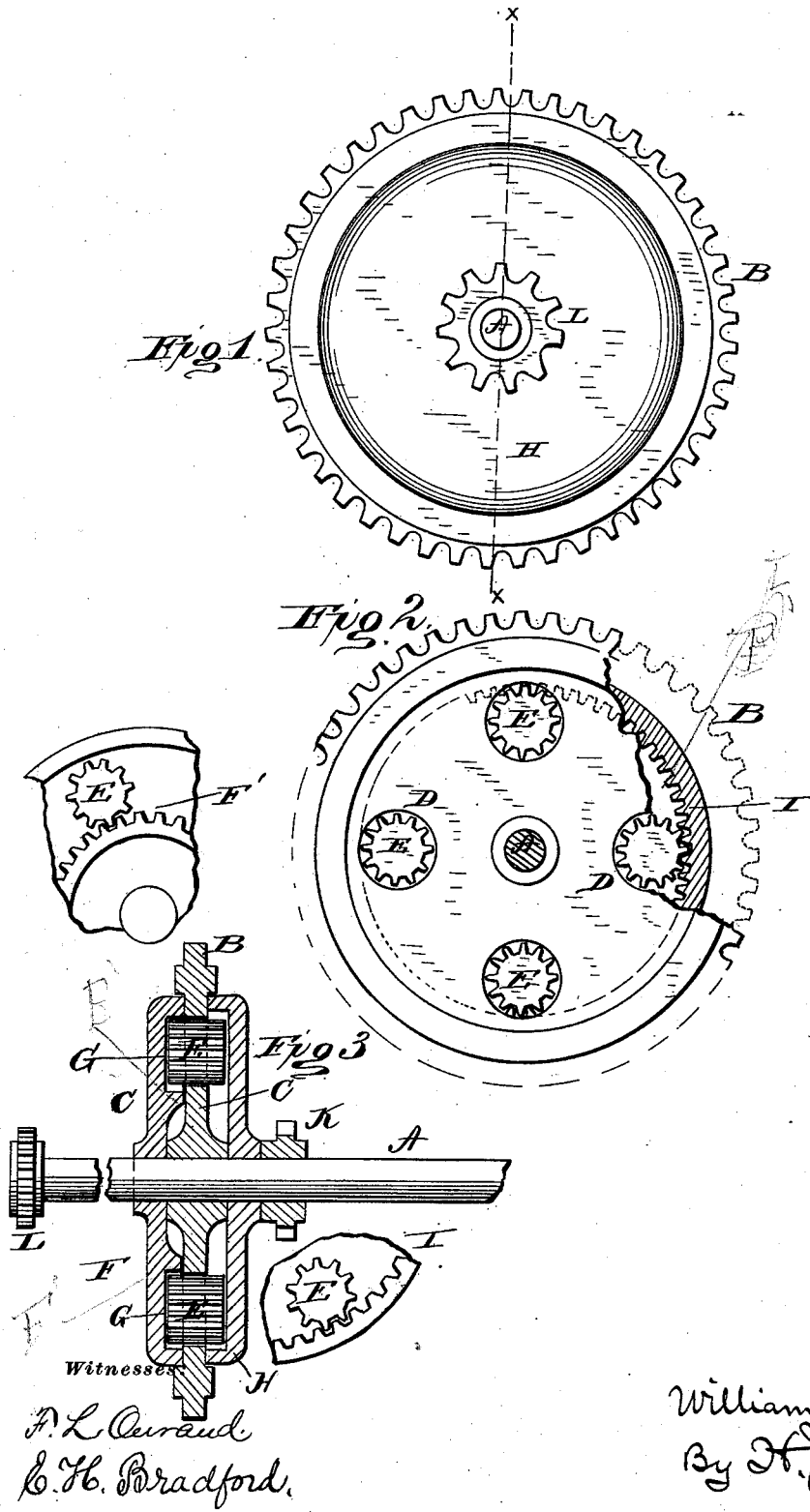

UNITED STATES PATENT OFFICE.

WILLIAM HEILMAN, OF EVANSVILLE, INDIANA.

GEARING FOR TRACTION-ENGINES.

SPECIFICATION forming part of Letters Patent No. 225,827, dated March 23, 1880.

Application filed February 19, 1880.

*To all whom it may concern:*

Be it known that I, WILLIAM HEILMAN, a citizen of the United States, residing at Evansville, in the county of Vanderburg and State of Indiana, have invented certain new and useful Improvements in Gearing for Traction-Engines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain improvements in mechanical movements, and is specially designed to be employed in connection with the counter-shaft and cog driving-wheels of a traction-engine; and it has for its object to prevent the breaking of the chain by providing for a differential motion of the wheels. These objects I attain by the mechanism illustrated in the accompanying drawings, in which—

Figure 1 is a front elevation, showing the counter-shaft having my improvement attached thereto; Fig. 2, a vertical section of the device, and Fig. 3 a transverse vertical section on the line $x$ $x$ of Fig. 1.

The letter A indicates the counter-shaft, and B a cog-wheel mounted loosely thereon. Said wheel is recessed on each face, as shown at C, and is provided with a series of circular apertures, D, in which are located and adapted to rotate a series of cog-pinions, E, which project into the recesses at each side of the wheel.

The letter F indicates a disk keyed to the shaft A and fitting in the recess at one side of the wheel B. Said disk is recessed on the face adjoining the face of the wheel, as indicated at G; and in this recess, around the center of the wheel, and attached to or forming part of the disk, is a cogged annulus, F', the teeth of which are adapted to intermesh with the pinions E.

The letter H indicates a disk similar in some respects to the disk F, which is loosely attached to the shaft A, and fits in the recess on the opposite side of the wheel B to the said disk F. This disk is recessed on its face adjoining the wheel B, and at its outer edge is provided with a series of internal cogs or teeth, I, which intermesh with the pinions E.

The letter K indicates a pinion rigidly secured to the disk H, and L a similar pinion attached rigidly to the shaft A. These pinions connect by chains with cogged gearing of the respective driving-wheels, and the cog-wheel B, by means of a chain, with the cogged gearing of the power mechanism of the engine.

By means of my invention it will be perceived that a variable motion will be given to the pinions on the disk H and shaft A when either meets with any undue resistance— as, for instance, when the engine is turning a sharp curve and one of the driving-wheels meets with more resistance than the other— thus permitting one wheel to move faster than the other in proper ratio to relieve the chains of any undue strain, thus obviating all tendency to breakage or injury to the chains or cogs. When the strain upon the pinions is equal a uniform motion will be given to the said pinions and driving-wheels—as, for instance, when the engine is traveling in a straight line.

Having thus described my invention, what I claim, and desire to secure by Letters Patent, is—

1. In a mechanical movement for transmitting motion, the combination, with a counter-shaft provided with a stationary pinion, of a cog-wheel carrying a series of pinions and two disks, one rigidly and the other loosely mounted on said shaft, one disk having mounted upon it a rigid pinion, and both being provided with cog-gearing intermeshing with the pinions carried by the cog-wheel, substantially as and for the purposes specified.

2. In combination with the counter-shaft A, the cog-wheel B, recessed at each side and provided with a series of apertures carrying pinions E, the disk F, keyed to the shaft A and provided with cog-gearing F', intermeshing with the pinions E, and the disk H provided with cog-gearing I, intermeshing with said pinions, and mechanism connecting said shaft A and disk H to the driving-wheels of a machine, substantially as and for the purposes specified.

In testimony whereof I affix my signature in presence of two witnesses.

WILLIAM HEILMAN.

Witnesses:
J. M. YZNAGA,
CHAS. L. COOMBS.